(12) United States Patent
Carlson et al.

(10) Patent No.: US 10,368,222 B2
(45) Date of Patent: Jul. 30, 2019

(54) SELF-DIRECTING NODE

(71) Applicant: Intel Corporation, Santa Clara, CA (US)

(72) Inventors: Christopher R. Carlson, Beaverton, OR (US); Rahul Khanna, Portland, OR (US); Greeshma Pisharody, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/714,999

(22) Filed: Sep. 25, 2017

(65) Prior Publication Data

US 2019/0098432 A1 Mar. 28, 2019

(51) Int. Cl.
| | | |
|---|---|---|
| *H04W 4/70* | (2018.01) | |
| *H04W 4/80* | (2018.01) | |
| *G06F 21/35* | (2013.01) | |
| *H02J 50/10* | (2016.01) | |
| *H04L 29/08* | (2006.01) | |
| *H04W 4/029* | (2018.01) | |
| *H04W 52/02* | (2009.01) | |
| *G06F 1/3287* | (2019.01) | |

(52) U.S. Cl.
CPC .......... *H04W 4/70* (2018.02); *G06F 1/3287* (2013.01); *H04W 52/0229* (2013.01); *G06F 21/35* (2013.01); *H02J 50/10* (2016.02); *H04L 67/10* (2013.01); *H04W 4/029* (2018.02); *H04W 4/80* (2018.02)

(58) Field of Classification Search
CPC ..... H04W 4/70; H04W 52/0229; H04W 4/80; H04W 4/029; G06F 1/3287; G06F 21/35; H04L 67/10; H02J 50/10
See application file for complete search history.

(56) References Cited

U.S. PATENT DOCUMENTS 8,970,377 B2    3/2015 Heine et al.
9,277,586 B2 *  3/2016 Orten ................... H04W 84/18
9,443,276 B2    9/2016 Barry, III
(Continued)

OTHER PUBLICATIONS

"Weaving the Wireless Web", Williams, Jennifer M.; Khanna, Rahul; Ruiz-Rosero, Juan P.; Pisharody, Greeshma; Yi Qian; et al. IEEE Microwave Magazine 18.7: 40-63. IEEE. (Nov. 2017) (Year: 2017).*

(Continued)

*Primary Examiner* — Brian T O Connor
(74) *Attorney, Agent, or Firm* — Schwabe, Williamson & Wyatt, P.C.

(57) ABSTRACT

Lost, misplaced, incorrectly delivered, and damaged assets are a common occurrence in shipment or asset tracking. Disclosed are various embodiments concerning a battery-less or intermittent battery use environments in which a node uses internal logic (e.g., circuitry and/or software) that, based at least in part on sensor information and stored information regarding the history of the node, may track events that have occurred to the node. The node may be responsive to events and determine whether exceptions have occurred that require attention. For example, detecting damage might cause the node to update an output to indicate the node and associated material, if any, needs to be rerouted to address the exception.

22 Claims, 10 Drawing Sheets

(56) References Cited

U.S. PATENT DOCUMENTS

| | | | | |
|---|---|---|---|---|
| 9,641,327 | B2* | 5/2017 | Nix | H04W 4/70 |
| 9,698,981 | B2* | 7/2017 | Nix | H04W 4/70 |
| 2012/0098642 | A1 | 4/2012 | Krawczewicz et al. | |
| 2012/0203511 | A1* | 8/2012 | DeVaul | A61B 5/0024 702/190 |
| 2012/0320923 | A1* | 12/2012 | Vasseur | H04W 40/22 370/400 |
| 2012/0322380 | A1 | 12/2012 | Nannarone et al. | |
| 2013/0182558 | A1* | 7/2013 | Orten | H04W 84/18 370/216 |
| 2014/0153674 | A1* | 6/2014 | Stratigos, Jr. | H04L 27/06 375/340 |
| 2015/0015401 | A1* | 1/2015 | Wedig | G08B 17/10 340/577 |
| 2017/0265124 | A1* | 9/2017 | Seemann | H04W 4/70 |

OTHER PUBLICATIONS

"Future proof IoT: Composable semantics, security, QoS and reliability", Abels, Tim; Khanna, Rahul; Midkiff, Kevin. 2017 IEEE Topical Conference on Wireless Sensors and Sensor Networks (WiSNet). Proceedings: 1-4;75. IEEE. (2017) (Year: 2017).*

"An innovative approach to dynamic platform and thermal management for Mobile platforms", Srinivasan, Vasudevan; Hermerding, Jim G.; Khanna, Rahul. Proceedings 2010 International Conference on Energy Aware Computing (ICEAC 2010): 4 . IEEE. (2010) (Year: 2010).*

"Proactive power optimization of sensor networks", Khanna, Rahul; Huaping Liu; Hsiao-Hwa Chen. 2008 International Conference on Communications: 3035-9. IEEE. (2008) (Year: 2008).*

"Dynamic optimization of secure mobile sensor networks: A genetic algorithm", Khanna, Rahul; Liu, Huaping; Chen, Hsiao-Hwa. IEEE International Conference on Communications: 3413-3418. Institute of Electrical and Electronics Engineers Inc. (Dec. 1, 2007) (Year: 2007).*

Federico Capello et al., "A Real-Time Monitoring Service based on Industrial Internet of Things to manage agrifood logistics," Jun. 1-4, 2016, 6th International Conference on Information Systems, Logistics and Supply Chain, Bordeaux, France, 8 pages.

* cited by examiner

SELF-DIRECTING NODE

TECHNICAL FIELD

The present disclosure generally relates to wireless sensor networks (WSNs), and more particularly, to large and dense sensor networks utilizing devices with limited power and intermittent data connectivity.

BACKGROUND AND DESCRIPTION OF RELATED ART

Lost, misplaced or improperly delivered assets are common occurrences in shipment or asset tracking use-cases. One typical solution for tracking assets is to apply barcodes that require a reader to associate encoded information to a record (e.g., in an asset database) identifying details related to an asset and/or shipment. Looking up an item, however, requires network connectivity, such as a cloud connection, to permit gathering information related to an asset.

Companies, whether a shipper, or third party logistic companies and retail distributors, need a comprehensive solution to monitor the condition and location of assets during all stages of shipment, including when there is no or limited network connectivity, such as when there is no power beyond what might be affixed to an asset undergoing travel, e.g., by way of a power source located in a sensor of tag. In some transportation environments, such as shipping, sensors on a specific package need to seamlessly move along a route from a gateway (GW) on a network in, for example, an origination warehouse, to a destination, such as a customer. Along the route, the package may come in contact with multiple other GWs within the warehouse, or in connection with transportation carriers, e.g., trucks, airplanes, carts, etc.

Transition along the route to the destination may or may not have communication capability to reach a GW that can make routing decisions. An asset may be out of range of a GW when an exception arises, such as damage to the asset, and this might not be known until much later in the delivery process. For example, an asset may be delivered damaged, requiring a shipper to re-send the asset. This is not only damaging to customer relations, but it is expensive to the shipper since typically they must cover replacement costs in addition to multiple shipping costs. Moreover, it is noted that existing wireless sensor network protocols restrict scalability and demand greater radio activity than is often feasible for dense low-power networks as may be employed on asset tags.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
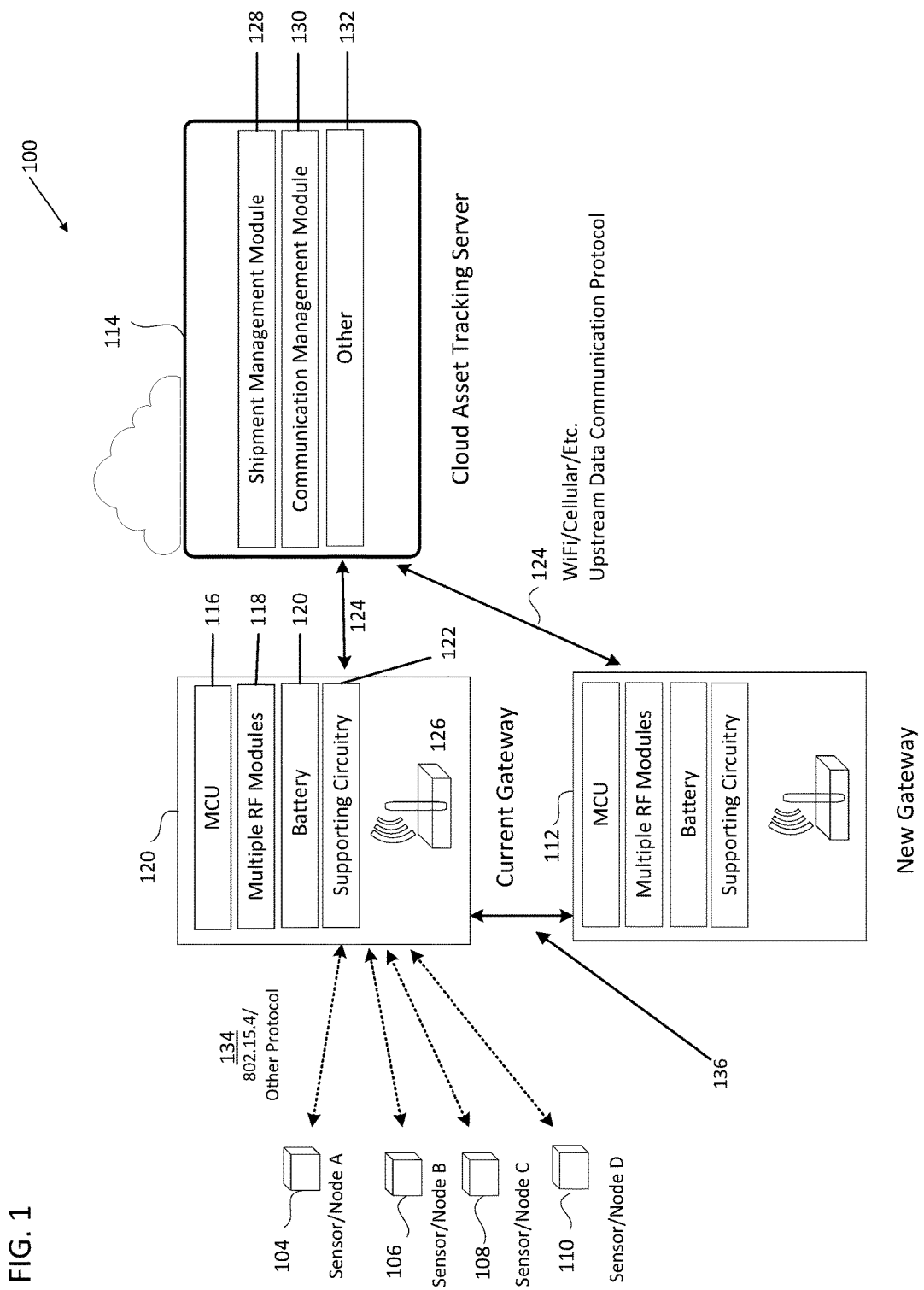
FIG. 1 illustrates an exemplary environment 100.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

In the illustrated embodiments, a technique to implement a chain of transfers for a sensor traveling from an origination (e.g., a warehouse) to a destination (e.g., a customer) is provided, where the sensor may take part in routing decisions for the sensor as it not only moves between one gateway (GW) to another in the warehouse, transport, etc. that have communication ability (e.g., using a wireless sensor network (WSN), near field communication (NFC), etc.), but also when the sensor has limited or no communication connectivity. This enables the sensor to make, for example, routing decisions to handle an exception (discussed below). It will be appreciated that sensors may employ a variety of local or longer-distance communications, such as those provided by WSNs, NFC, Wi-Fi, or other wireless technology discussed in more detail below with respect to FIG. 5.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

FIG. 1 illustrates an exemplary environment 100, wherein a system for providing transfer of custody communications, as well as monitoring for any "lost" sensors/nodes as a sensor moves out of range of an apparatus 102 such as a gateway (GW) or other device, which may be in a warehouse, truck, rail car, rolling stock, airplane, cargo carrying device or vehicle, drone, or other device where goods are prepared and/or packaged for transit to a destination, are in transit, or have reached a destination. For the purposes of this description, the apparatus 102 is designated the "Current Gateway", i.e., the gateway to which exemplary devices 1-4 104-110 are communicatively coupled. In the illustrated embodiment it is assumed devices 104-110 are "Sensors" or "Nodes" assigned to apparatus 102 but it will be appreciated other devices may be in communication with the gateway. Regarding terminology, nomenclature allows for referring to the devices by different names, e.g., node, sensor, smart sensor, smart tag, etc. Since the present disclosure also refers to sensors associated the devices 104-110 to track events occurring to the devices, to avoid confusion, devices will be referred referenced hereinafter simply as a device, devices, node or nodes.

In asset tracking systems, such as may be included in system 100, nodes 104-110 may be attached or otherwise associated with packages, units of merchandise, or the like, and multiple nodes may be assigned to, and monitored by, apparatuses such as gateways. As described below, each of the nodes may include various sensors. For the purposes of this description, the term "gateway" includes any device to which a particular node is assigned, even for a short time, as in what is known as an "intermediary" or gateway "proxy" for a node. For example, a warehouse may have various gateways installed, which monitor sensors on packages or pallets of merchandise. When a new shipment comes into the warehouse on a truck, for example, the merchandise in the truck may generally be monitored by, and thus assigned to, a gateway installed on the truck. Once unloaded, it may be that a first portion of the packages in the truck are to be sent onwards to one destination, and a second portion of the packages others to a wholly different one. It may also be that when the truck initially enters the warehouse, the gateways to which each of the first and second portions of packages are to be assigned to for the next leg of their respective journeys may not yet be known, and thus each of the portions may be assigned to a representative or proxy of their actual next gateway, which will subsequently hand them off to the gateway that will monitor them on the next leg of their respective journeys. In some contexts, a node may be known as a "child", and the gateway to which it is assigned as its "parent." In a transfer of custody as described below, one or more "children" are advised that they are now in the custody of a new "parent."

Apparatus 102 may be one or more hardware devices and/or one or more software modules and/or any combination of hardware and software that carry out the monitoring and communication with nodes 104-110 in a premise or venue. In embodiments, the one or more hardware devices may be tamper resistant and operations may be carried out independent of processor(s) of a host/application platform. In embodiments where the apparatus is implemented as one or more software modules, the software modules may include "enclaves" which may be isolated regions of code and/or data within the memory of a computing platform. (See, for example, the Intel® Software Guard Extension Enclaves). As illustrated, the apparatus 102 may coordinate with a second apparatus 112, each a gateway to which are assigned, or may be assigned, several nodes. The description of apparatus 112 may be identical to that for apparatus 102.

Apparatus 102 may communicate with a Cloud Server 114 of system 100, as described below. In embodiments, apparatus 102 may include a Microcontroller Unit (MCU) 116, Multiple RF Modules 118, a Battery 120 and Supporting Circuitry 122. In embodiments, RF Modules 118 may include any of a number of communication technologies, such as WiFi, cellular and Near Field Communication (NFC) modules, and may be implemented in circuitry, communications circuitry of various types, and/or in combination of software. It is noted MCU 116 may be implemented as a Texas Instruments (TI) CC2630, or the like. Microcontrollers may be embedded controllers that perform compute functions at low power and use relatively quicker sleep-wake and wake-sleep timing. In embodiments, MCU 112 may also contain the Media Access Control (MAC) layer of the wireless radio. It is noted that the Media Access Control Layer is conventionally one of two sublayers that make up the Data Link Layer of the OSI model. The MAC layer is responsible for moving data packets to and from one Network Interface Card (NIC) to another across a shared channel.

In embodiments, apparatus 102 may communicate with Cloud Server 114 via Upstream Data Communication Protocol 124, which, in embodiments, as shown, may include a WiFi or cellular connection, or other appropriate communications link, and apparatus 102 may communicate with nodes 104-110 over wireless connections 134, using, for example, the IEEE 802.15.4 protocol, or some equivalent protocol, as the case may be. IEEE 802.15.4 is a technical standard which defines the operation of low-rate wireless personal area networks (LR-WPANs). It specifies the physical layer and media access control for LR-WPANs, and is maintained by the IEEE 802.15 working group, which defined the standard in 2003, and published an updated version in 2006, IEEE 802.15.4-2006. Familiarity with these protocols is assumed herein.

In embodiments, apparatus 102 may communicate wirelessly, via RF Modules 118 and communication interface 126 (which may be a modem or other interface over which data may pass) with nodes 104-110 or other such devices in its general physical vicinity. As noted above, the nodes may be smart tags which may be packed inside packages or pallets of merchandise, or attached to them or otherwise associated thereto, as the case may be. Each of the nodes may include a sensor microcontroller unit (MCU), through which it communicates with apparatus 102, and a set of sensors, such as one or more of a humidity/temperature sensor which may measure characteristics of the node and/or the node's environment, a multi-axis and tilt sensing accelerometer, an ambient light sensor, pressure sensor, a battery, etc. as will be discussed further with respect to FIG. 2. As used herein, and in the claims, nodes assigned to a gateway (e.g., apparatus 102) may be said to be part of that gateway's network. In that sense, a wireless sensor network (WSN) includes many such individual gateways (e.g. apparatuses 102, 112), each with its own "network," where the gateways may communicate with the cloud, and as described herein, with other gateways, and even with the nodes currently assigned to another gateway. Thus, the WSN may be considered a single network.

Each apparatus 102, 112 may receive information from the cloud, e.g., from Cloud Asset Tracking Server 114, regarding which nodes (e.g., smart tags) to hand off to another apparatus, such as, for example, informing Current Gateway 102 to hand off custody of some or all of nodes 104-110 to a New Gateway 112. The Cloud Asset Tracking Server may be one or more hardware devices and/or one or more software modules that carry out the collection of data regarding shipments and individual packages or pallets within those shipments, and the tracking of those shipments via data received from various gateways that report to it. In embodiments, the one or more hardware devices may be tamper resistant and the operations may be carried out independent of processor(s) of a host/application platform. In embodiments where the Cloud Asset Tracking Server is implemented as one or more software modules, the software modules may include "enclaves" which (as discussed above) may be isolated regions of code and/or data within the memory of a computing platform.

The Cloud Asset Tracking Server 114 may include a Shipment Management Module 128, a Communication Management Module 130. The Communication Management Module may be one or more software modules that operate in conjunction with one or more hardware devices to configure communications circuitry (not shown) to communicate with one or more apparatuses 102, 112. The Cloud Asset Tracking Server may include, or may be expanded to include, other module(s) 132. In embodiments, one apparatus 102 may communicate with another apparatus 112, over wireless protocol 136, which may be a communications protocol based upon 802.15.4, or any other wireless technology.

In some embodiments, the Cloud Asset Tracking Server periodically obtains information from a node (see, e.g., FIG. 4 discussion), such as to obtain sensor or other data to monitor progress of a node that, for example, may be in transit from an origin to a destination. It will be appreciated a node is expected to be periodically in and out of communication with the Cloud Asset Tracking Server (or other devices) and that a node may store and forward information as needed. It will be further understood that events, such as damage to a node, may occur while in communication with a gateway, in which case a gateway may automatically respond to the even and re-route or otherwise disposition the node. Or, an event such as damage may occur while the node is out of contact, and in such a case a new gateway could identify the event and disposition the node, the Cloud Asset Tracking Server may obtain information from the node identifying the error and the Cloud Asset Tracking Server initiates action to be taken for the node. In one embodiment, the node updates an output (see FIG. 2 discussion) to indicate need for resolving an event, such as an exception to sensor limits associated with the node, and a device in the node's environment (e.g., conveyance machines) respond to the event as requested by the node. Such action may be reported to the Cloud Asset Tracking Server, gateways or other devices as needed or desired.

Figure 2:
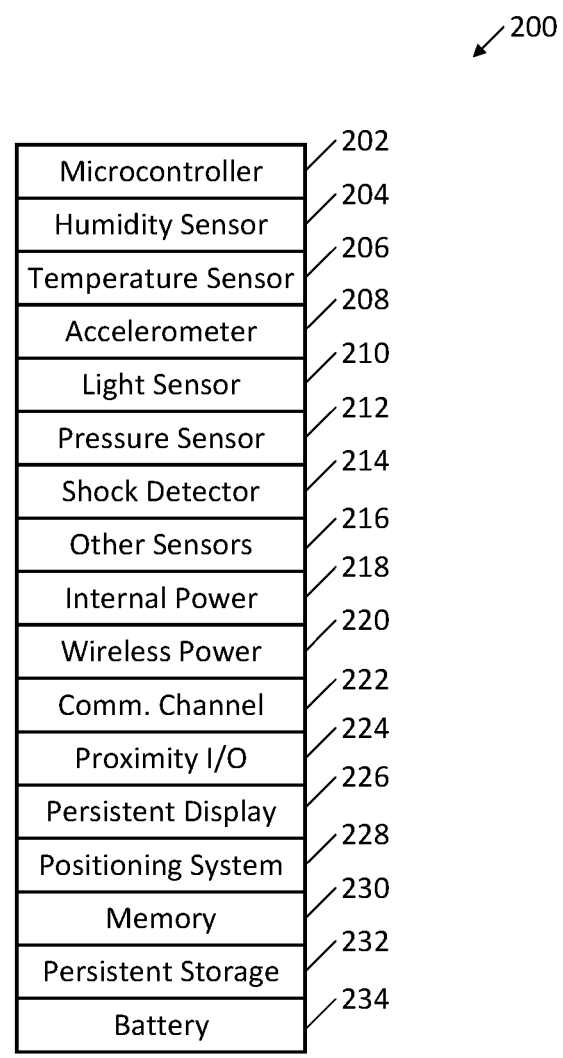
FIG. 2 illustrates an exemplary node 200.

FIG. 2 illustrates an exemplary node 200. As discussed above with respect to FIG. 1, each of nodes 104-110 may include a variety of components. The illustrated node 200 may contain a microcontroller 202 (e.g., a MCU), through which it communicates with other devices such as FIG. 1 apparatus 120. It may also contain a set of sensors, such as one or more of a humidity sensor 204, temperature sensor 206, an accelerometer 208 (e.g., a "6D" device to measure shock and tilt), an ambient light sensor 210, a pressure sensor 212, a shock detector 214, e.g., to identify when a sensor such as one associated with a package (such as one in a smart tag on a package) has been dropped or otherwise put under excessive force. It will be appreciated that there may be other sensors 216 not illustrated depending on the expected use or possible environment for the sensor. It will be appreciated the illustrated sensors and other sensors not illustrated all represent input to logic/software to make decisions regarding the sensor, such as exception handling or other functionality.

It will be appreciated that even if node 200 is considered a low-power device, it still requires some power, at least intermittently, to operate. It will be appreciated the node may contain internal power 218 such as a battery, capacitor, or any other material or fabric capable of storing a charge, and the node may be configured to operate in a variety of power modes depending on what the node is doing. For example, it may operate in a first mode that is very low power, providing only very basic sensor monitoring service, and based on sensor input provide a second mode in a slightly more power-consuming state to enable the node to perform certain tasks, and the node may provide a third or additional modes for providing even more functionality requiring even more power use. In effect power modes allow minimizing battery use until more functionality is needed, and power use may be tiered to allow as-needed power consumption to respond to sensor 204-216 input.

In addition to, or instead of, internal power, the node may also have access to wireless power 220. It will be appreciated that any type of wireless power transmission may be used, one well known example being inductive charging technology which may be used in combination with internal power to refresh the internal power source (e.g., to charge it), or it may be used as operational power in one or more power states provided by the node. The wireless power may also be based on other processes, such as heat differential, pressure (piezo-electric), etc., anything that may generate a small flow of power to operate the node. It will be appreciated certain scanning operations may also operate, as an effect of the scanning, to provide power to a node so that, for example, the node may be scanned but also temporarily receive power to use, inspect, etc. sensors or take action on information available to the node.

A node may need to communicate. It will be appreciated the node might have one or more communication channels 222, which may be used by wireless communication techniques some of which are discussed further below with respect to FIG. 5. There may also be wired connectivity based communication channels such as communication ports, or contacts, over which data (and power) may be transferred. It will be appreciated various communication techniques may employ antenna as needed to accommodate communication needs. In addition to or in lieu of communication channels 222, there may also be proximity I/O 224 capabilities, such as near field communication (NFC), which is a term representing many different underlying signaling techniques, or inductive communication, including Radio-frequency identification (RFID). It will be understood NFC is related to multiple different standards, such as standards including ISO/IEC 14443, and ISO/IEC 18092 both of which can be viewed at Internet Uniform Resource Locator (URL) www.iso.org. There are many other NFC related technologies for engaging with mobile devices such as cell phones.

A node may also have display options. For simplicity it is assumed the node has a low-power persistent display 226, such as one based on "E Ink" or "electronic paper", which are well-known types of low-power persistent display technology popular, for example, with digital book readers, consumer electronic displays, and pricing labels in stores. The display 226 may be used to persistently display status information for the node, a barcode (that of course may be changed as desired) to identify the node, and/or indicate routing information or changes, and/or other data such as to provide instructions for an environment (e.g. an automated conveyance system) to direct routing of the node—and hence anything to which it is attached. The display may of course be responsive to sensor 204-216 or other input, such as a positioning system 228 which may be one of many known positioning systems or location triangulation or hotspot association scheme, such as a Global Positioning System (GPS), cellular tower (or other known transmitter) based triangulation, etc.

It will be appreciated that during operation, a node, such as node 200 or Sensors/Nodes A through D 111-˜08, may make use of memory 230 and/or persistent storage 232. The memory and storage will facilitate node operation and responsiveness to sensor or other environmental input. In addition, as noted above, there may be multiple power modes and, for example, a node may temporarily access a higher-power mode after, for example, the shock sensor indicates the node has been dropped. In response the node might enter a higher power state (i.e. "wake up"), evaluate the extent of a shock, and as appropriate document the shock in persistent storage. The node may also, as will be discussed further below, update the display 226 as needed, such as to indicate a problem, request rerouting of the node (and object(s) if any associated with the node), or other action. It will be appreciated that cryptographic techniques may be used to secure the content of storage such as persistent storage 232. Cryptographic techniques may also be used to encode or watermark or otherwise affect the content of the display 226 to facilitate authenticating the source of any action presented on the display, e.g., to authenticate either an external source instructed the node to take a certain action or the node itself determined an action is required.

As discussed above, the memory 230 and/or persistent storage 232 may contain data related to asset attributes, anomaly data and shipping related information. The memory or storage may be part of an NFC object, the node, or both if the node incorporates a NFC component. It will be appreciated traditional asset management uses BAR codes that require visual scanning instead of proximity based scanning, e.g. near field scanning such as NFC. NFC allows scanning system flexibility. Memory 230/storage 232 allow storing additional information not directly possible in a conventional tagging environment such as with BAR codes unless continuous network connectivity is guaranteed to allow update the attributes of a barcode record during node travel. This may not be possible in areas where connectivity in unavailable or regulations do not allow RF transmissions. When in communication range, stored information from the node can be read using an automated scanner to retrieve recorded information, which may be organized chronologically to allow for validating use cases requiring a particular sequence of events. Use cases may be extended into other areas related to medical scanning (Like BAN), where patterns of activity can be stored and retrieved as needed.

It will be appreciated information stored in the node, including logs from the sensors 204-216 may be used as evidence of acceptable handling of goods and for insurance purposes. Information may be stored openly and/or as discussed above, privately by way of cryptographic techniques, e.g., PKI (public key infrastructure) or public-key cryptosystems. Private information may be stored using a public key so that its contents may only be retrieved by the entity that is supposed to receive this information (using private key) thereby keeping the sensitive information anonymous. Alternatively, data may be cryptographically signed, but not hidden, so that authenticity of the data may be verified. For example, to authenticate data being presented on the persistent display 226.

It should be appreciated from the above that the persistent storage 232 (or other memory, not-illustrated) may a variety of information within the node, including but not limited to a shipping manifest, attributes related to a sensor network cluster, chronological information related to anomalies (if any) experienced by a node during transit, chronological information related to the coordinates of way-points, or any other data that may be useful to the handling, routing, or other activity related to the node or any object associated with the node, e.g. a package, luggage, etc. Storing this information in the node (though it may be copied in whole or in part externally, such as in a cloud), allows nodes, and records associated with the node, to be processed at the edge instead of in the cloud which is advantageous in case there is no cloud connectivity due to no network connectivity, such as when in a restricted environment such as an airplane, or in areas with poor or non-existing signaling such as within a ship, container, etc. In one embodiment, persistent storage 232 allows a node to back-up anomaly data into the node itself and convey a summary of the data, or the data itself, once the communication channel 222 can establish a network. Data may be retrieved from a node or presented by the node over any communication technique available to the node, such as those discussed above.

As discussed above, a node may accommodate wireless power 220 options, but it will be appreciated that a node may also provide a battery 232 to enable higher power requiring modes, such as operations to operate sensors 204-216, communicate over the communication channel 222, update the display 226, read or write persistent storage 232, etc. It will be appreciated the battery may be implemented in any of a variety of technologies providing stored power, such as a coin cell battery or the like, capacitor, etc.

Figure 3:
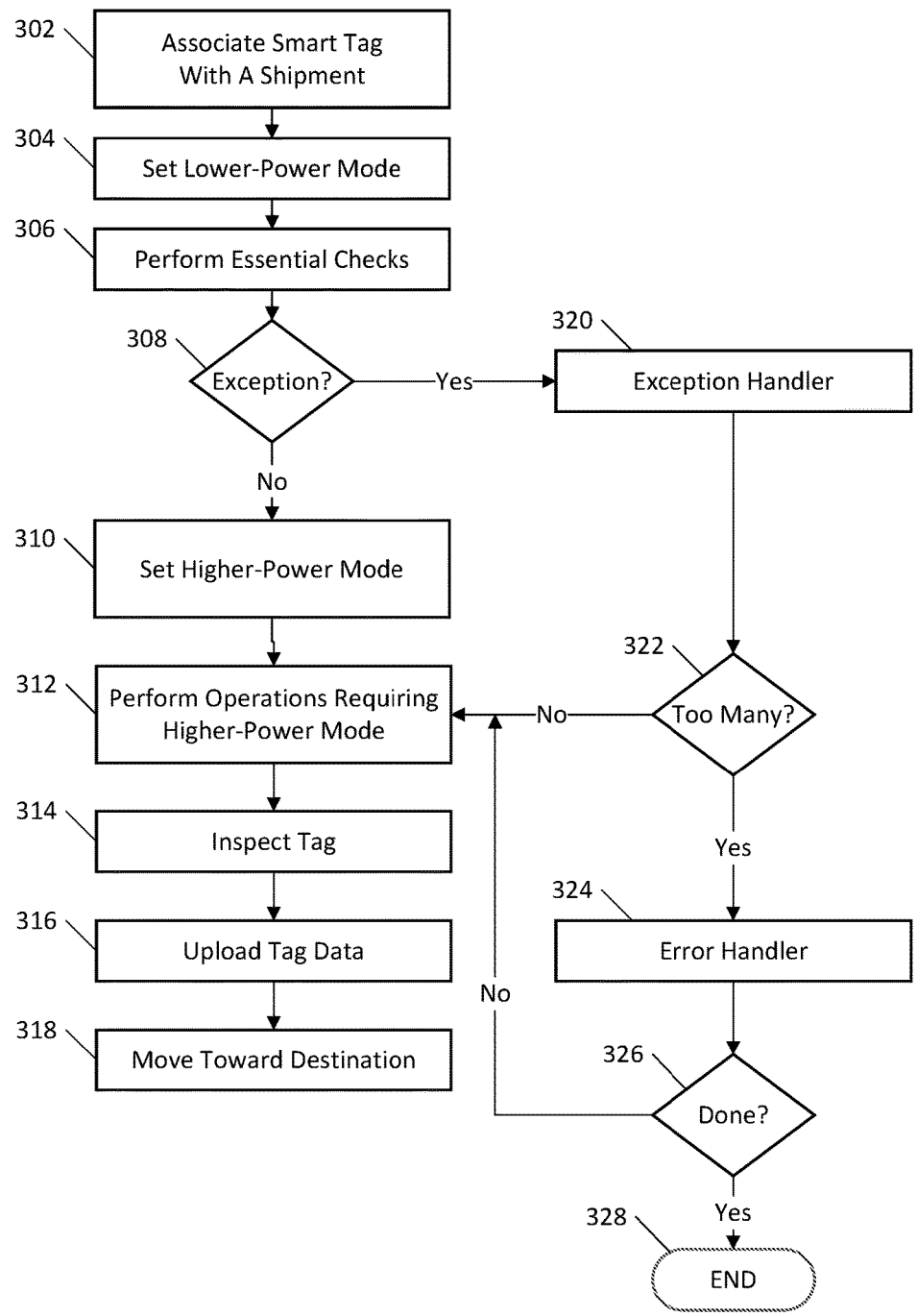
FIG. 3 illustrates an exemplary environment 300.

FIG. 3 illustrates an exemplary environment 300 according to one embodiment of the invention. In the illustrated embodiment let's assume that a node as described with respect to FIGS. 1 and 2 is embodied as a smart tag associated with an asset being shipped. As illustrated, a preliminary operation is to associate 302 the tag with shipment of an asset, where association includes some physical association of the tag with the asset, e.g., placing the tag on the asset as a label, within the asset, affixed to a pallet, etc. and associating a destination for the tag, e.g., by setting a display/output from the tag to indicate a destination for the asset.

In the illustrated embodiment, during shipment, the node operates to regularly collect and process data to determine a "digital trail" corresponding to perceived handling of the tag over some period of time. For example, the trail may include storing data indicating asset handling, asset waypoints that have been seen, asset source, asset destination(s), and the like. This type of information allows an asset management system to perform autonomous handling of an asset associated with the tag without requiring the typical centralized infrastructure normally used with shipping. In particular, the illustrated tag may be managed even if a location does not provide for, or does not allow, networking communication to assist with asset processing. As discussed with respect to FIG. 2, the tag may include a memory to store data related to asset attributes, anomaly data, shipping related information, etc.

The node may initially be set 304 in a low power mode where a microcontroller for the tag may operate to monitor activity happening to the asset. In the low-power mode the tag conserves power resources by performing 306 checks deemed to be "high-priority", for example, to confirm basic asset integrity and proper asset handling. As discussed above a manifest may be stored in the memory that describes the expectations on the handling and shipping of the asset. For example, the manifest may indicate the default route for the asset, and also indicate thresholds for valid environmental (temperature, humidity, light, etc.) or stress (orientation, g-shocks, pressure, etc.) constraints for the asset, where exceeding the thresholds indicates an exception. The manifest may indicate handler devices or new destinations for some or all exceptions, such as indicate return the asset to its origin and not continue delivery. If 308 there has not been an exception, for the purposes of this illustration, processing loops back to continuing to perform essential checks and monitor for exceptions.

If 308 there appears to be an exception to integrity/handling of the asset, this may not have been the first exception and a test may be performed to determine if 310 there have been to many exceptions. If 310 not, then processing may continue and, for example, the tag may be switched 312 into a higher power mode to facilitate the tag performing 314 operations requiring more power, such as fetching additional sensor data, storing anomaly data in the memory, updating a display on the tag, etc. In one embodiment the content of a display such as FIG. 2 persistent display 226 may be updated as an asset moves from an origin to destination. Machines in the environment, e.g., conveyor belt systems, automated pallets, self-driving machines, grasping apparatuses (which may pick up and place an asset), drones (which may also be configured to monitor a tag's status and pick it up), these machines may inspect 316 the tag and take action, such as to divert the tag and associated asset(s) as needed.

In one embodiment, the node/tag of FIGS. 2 and 3 disclosed herein may store in the memory 230 and/or persistent storage 232 cryptographic information to allow a node to encode its data so that during inspection 316, some or all of the node's data may optionally be securely uploaded 318 from the node to a machine on a network currently associated with the node, for example, an asset tracking server maintained by the shipper. It will be appreciated that uploading may occur every time the tag is read by a device having network connectivity, intermittently, such as responsive to an event or cumulative impact of a series of events impacting the asset, or not at all. In one embodiment a service level agreement of quality of service (QoS) associated with the shipment of an asset may factor in to attempts to upload stored data. It will be understood by one skilled in the art that data uploads may be provided as one or a few compressed bursts of data to minimize power requirements when the node is operating on internal power such as the FIG. 2 battery 234. The ability to store and forward (upload) data may be used in a variety of contexts beyond shipping. For example, it may be used in a medical scanning environment such as one with a Body Area Network (BAN), where patterns of activity may be stored and retrieved by a medical professional as needed. In addition, information stored in the node (or associated therewith) may be used as evidence of acceptable handling of goods and/or services associated with the node for insurance purposes.

As discussed above, a test may be performed to determine if 310 there has been too many exceptions which may be evaluated with respect to at least constraints in the manifest. If 310 so, an exception handler may be invoked 322. As illustrated for items 312, 314, the Exception Handler may also transition 324 the Tag to a higher-power mode and perform error handling such as to update 326 a memory to record, for example, the exception and selected sensor, environmental, server identity and/or other data to track the number, kinds of and circumstance for events happening to the asset. Another operation may be to update 328 an output for the tag, such as to change a display to indicate an error status, or show a new destination (e.g., an error handling location in a warehouse, or new shipping address to reroute the tag back to a shipper, etc.). It will be appreciated that these are exemplary Exception Handler operations and others may be performed. The appropriate action may be by default, and/or encoded within the manifest, and/or set by an environment in which the tag is present.

Depending on the number and/or types of errors, it will be appreciated that a further test may be performed to determine if 330 the nature of the error or the number of errors or some other information in the manifest or circumstances surrounding the tag suggests that handling of the tag should stop. Which, as noted above, might in one embodiment include changing the output of the tag to reflect a decision to halt movement of the tag toward its intended destination. It will be appreciated that the test to determine if 330 processing should stop may also occur after uploading 318 tag data based on the current status of the tag, sensors, and/or associated asset. Not shown are operations related moving the tag and/or asset to a final destination as needed depending on the specific exception(s) being handled. If handling of the asset is not concluded, handling of the asset may continue, for example, with moving 332 the tag and associated asset (if any) onward for continued processing/handling.

It will be appreciated the illustrated operations may be automatically performed periodically as part of a built-in self-test for operation of the tag. Test results may be stored in the memory and used in determining if/when asset shipping should be modified as discussed above. For example, if a tag is found to be defective or has become damaged in shipping, the asset may be diverted for replacing the tag and/or inspecting the asset for damage before allowing asset shipment to continue. It will be appreciated diverting an asset may occur without intervention since a tag may automatically update its output with a new destination based on an exception and/or built-in test (BIST) results based on, for example, values indicated by one or more of FIG. 2 sensors 204-216. It will be further appreciated output from the tag may be by way of the persistent display 226, proximity I/O 224, e.g., a signal that may be read by a NFC reader or other proximity data transfer which may occur for example in item 316, or otherwise provided on an output associated with the tag.

Figure 4:
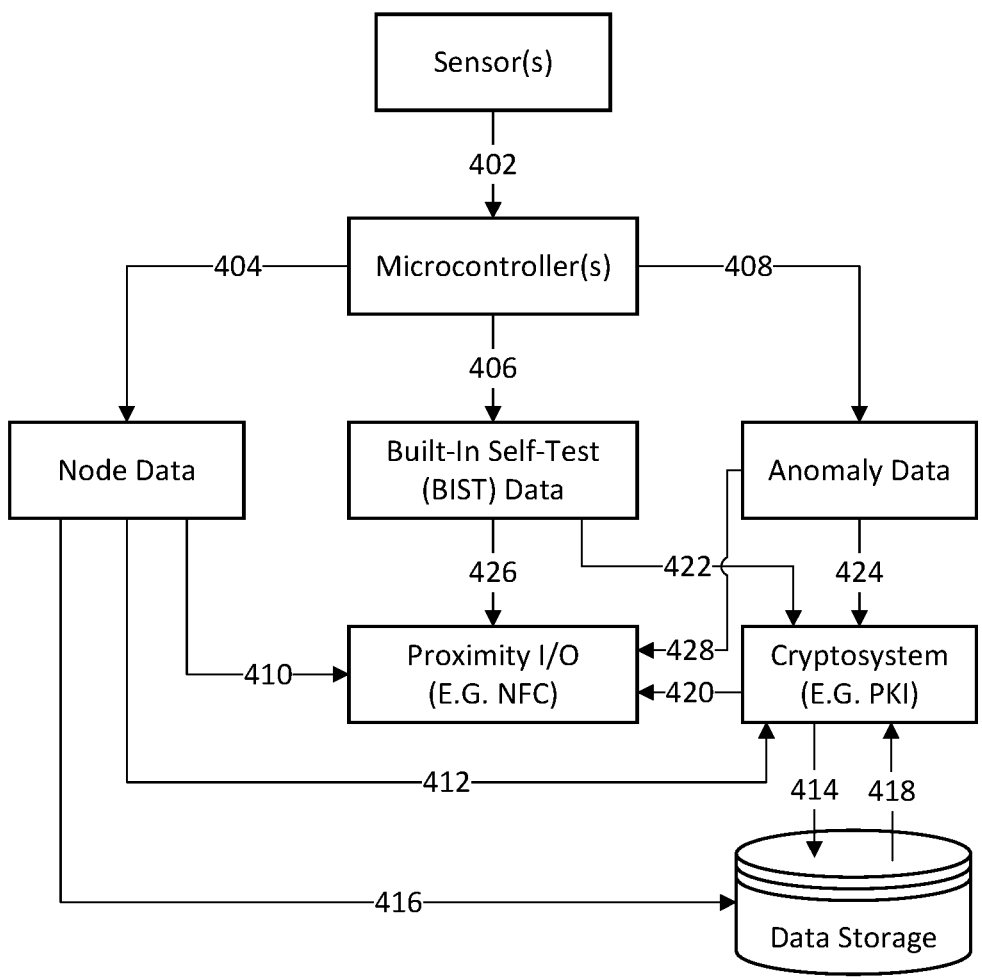
FIG. 4 illustrates an exemplary environment 400.

FIG. 4 illustrates an exemplary environment 400 illustrating a node which as discussed above with respect to FIG. 2 may be a tag, smart tag, smart device, etc. As illustrated sensors may, as needed, collect information about the node and/or the node's environment. This data may be presented 402 to one or more microcontrollers (e.g., processor(s)). It will be appreciated that in terms of circuitry coupling components of the node, the sensors may be sending data to the microcontroller and/or the microcontroller may be pulling readings off of the sensors. The sensor data may be processed by the microcontroller and separated into types of data received.

In the illustrated embodiment sensor data has been somewhat arbitrarily separated into different types of data, where data about the node's environment, it's manifest, information about what's occurring to the node, e.g., transit origin, transit destination, next step in a route, etc. may be recorded 404 as Node Data. Other data such as results from various BIST operations may be recorded 406 as BIST Data. And, if the microcontroller, by way of inspecting the manifest associated with the node (stored in Node Data), or other information concerning the proper treatment of the node, recognizes an exception to acceptable parameters, it may flag an anomaly that may be recorded 408 as Anomaly Data. It will be appreciated as noted above these distinctions are exemplary and that other data segregation, or no segregation, may be performed as desired.

During operation, the node may present 410, for example, the identified Node Data to a Proximity I/O transceiver, such as a NFC communication component of the node. This will allow, as discussed above, the node to transfer this data, if desired, to an external device. The external device may be, in a shipping example, an asset tracking server associated with a shipper. It will be appreciated where data is transferred to is dependent on circumstance. In some embodiments, rather than directly present 410 data to the Proximity I/O, instead the data is presented 412 to a cryptosystem component of the node that employs a PKI or other cryptographic feature to encode/protect the data. As previously discussed the node may be operating self-contained and autonomous in-between ability to obtain a connection to another device such as by way of the Proximity I/O or other network connection (see, e.g., FIG. 2 communication channel 222). When autonomous, the node may store 414 encrypted data in a data storage such as a database or other persistent storage or memory. It will be appreciated that if security of the data storage is not critical, the Node Data may be directly stored 416.

When connectivity for the node is available, data stored 416, 416 in the data storage may be retrieved 418, for example, by the Cryptosystem and presented 420 to the Proximity I/O. It will be appreciated that other components of a node, not illustrated may also be communicatively coupled with the data storage, Cryptosystem, Proximity I/O, etc. Similar to handling the Node Data, the BIST Data and Anomaly Data may be presented 422, 424 to the Cryptosystem for encoding and presenting 420 to Proximity I/O for transfer external to the node as discussed above, or the BIST Data or Anomaly Data may be stored 414 for later retrieval 418 and presenting 420 to the Proximity I/O. It will be appreciated as with Node Data, some or all of the BIST Data and Anomaly Data may be directly presented 426, 428 to the Proximity I/O without use of the Cryptosystem. It will be appreciated by one skilled in the art that the microcontroller may elect to lock some or all of the data in the Data Storage or other memory associated with the node to prevent tampering. Also, memory may be configured to be write-once memory so that events and other information may be logged but not deleted. Depending on the nature of use of the node such security provisions may be used to ensure ability to comply with regulatory requirements for proof of handling, as well as complying with insurance requirements or other obligations related to handling the node or associated asset.

Figure 5:
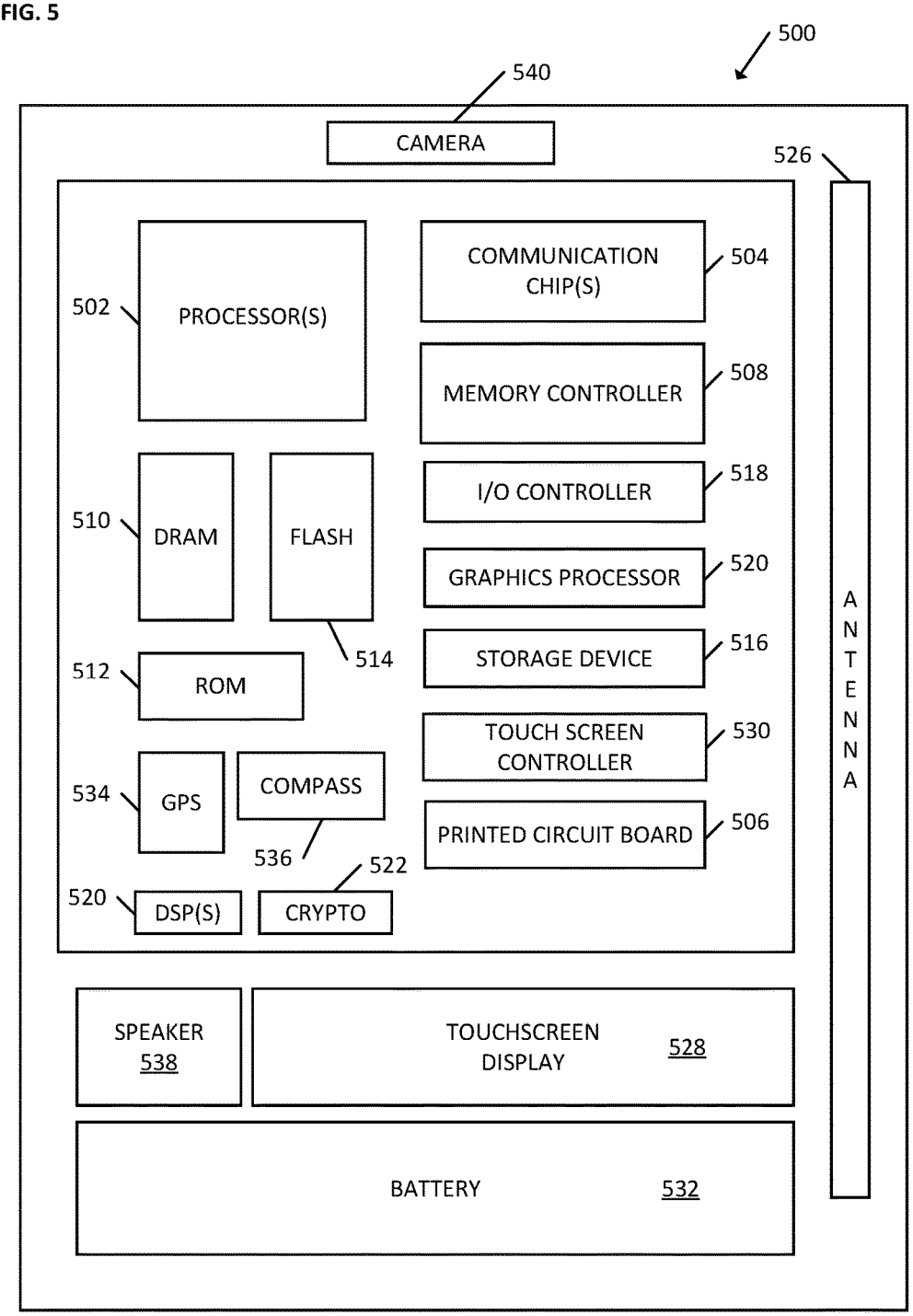
FIG. 5 illustrates an exemplary computer device 500 that may employ the apparatuses and/or methods described herein.

FIG. 5 illustrates an exemplary computer device 500 that may employ apparatuses and/or methods described herein (e.g., FIG. 1 gateways 112, 120 or server 114 or other devices in communication with a node), in accordance with various embodiments. As shown, computer device 500 may include a number of components, such as one or more processor(s) 502 (one shown) and at least one communication chip(s) 504. In various embodiments, the one or more processor(s) 502 each may include one or more processor cores. In various embodiments, the at least one communication chip 504 may be physically and electrically coupled to the one or more processor(s) 502. In further implementations, the communication chip(s) 504 may be part of the one or more processor(s) 502. In various embodiments, computer device 500 may include printed circuit board (PCB) 506. For these embodiments, the one or more processor(s) 502 and communication chip(s) 504 may be disposed thereon. In alternate embodiments, the various components may be coupled without the employment of PCB 506.

Depending on its applications, computer device 500 may include other components that may or may not be physically and electrically coupled to the PCB 506. These other components include, but are not limited to, memory controller 508, volatile memory (e.g., dynamic random access memory (DRAM) 510), non-volatile memory such as read only memory (ROM) 512, flash memory 514, storage device 516 (e.g., a hard-disk drive (HDD)), an I/O controller 518, a digital signal processor 520, a crypto processor 522, a graphics processor 524 (e.g., a graphics processing unit (GPU) or other circuitry for performing graphics), one or more antenna 526, a display which may be or work in conjunction with a touch screen display 528, a touch screen controller 530, a battery 532, an audio codec (not shown), a video codec (not shown), a positioning system such as a global positioning system (GPS) device 534 (it will be appreciated other location technology may be used), a compass 536, an accelerometer (not shown), a gyroscope (not shown), a speaker 538, a camera 540, and other mass storage devices (such as hard disk drive, a solid state drive, compact disk (CD), digital versatile disk (DVD)) (not shown), and so forth.

In some embodiments, the one or more processor(s) 502, flash memory 514, and/or storage device 516 may include associated firmware (not shown) storing programming instructions configured to enable computer device 500, in response to execution of the programming instructions by one or more processor(s) 502, to practice all or selected aspects of the methods described herein. In various embodiments, these aspects may additionally or alternatively be implemented using hardware separate from the one or more processor(s) 502, flash memory 514, or storage device 516. In one embodiment, memory, such as flash memory 514 or other memory in the computer device, is or may include a memory device that is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In various embodiments, one or more components of the computer device 500 may implement an embodiment of the FIG. 1 gateways 112, 120 or server 114, or the FIG. 2 node 200, etc. Thus for example processor 502 could be the FIG. 1 116 or FIG. 2 202 communicating with memory 510 though memory controller 508. In some embodiments, I/O controller 518 may interface with one or more external devices to receive a data. Additionally, or alternatively, the external devices may be used to receive a data signal transmitted between components of the computer device 500.

The communication chip(s) 504 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device may include a plurality of communication chips 504. For instance, a first communication chip(s) may be dedicated to shorter range wireless communications such as Wi-Fi and Bluetooth, and a second communication chip 504 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example the communication chip(s) may support RoCE (Remote Direct Memory Access (RDMA) over Converged Ethernet), e.g., version 1 or 2, which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANS), parallel computing using RDMA, Internet Wide Area Remote Protocol (iWARP), InfiniBand Architecture (IBA), and other such technology. Computer device 500 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 500 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder, or a transportation device (e.g., any motorized or manual device such as a bicycle, motorcycle, automobile, taxi, train, plane, etc.). In further implementations, the computer device 500 may be any other electronic device that processes data.

Figure 6:
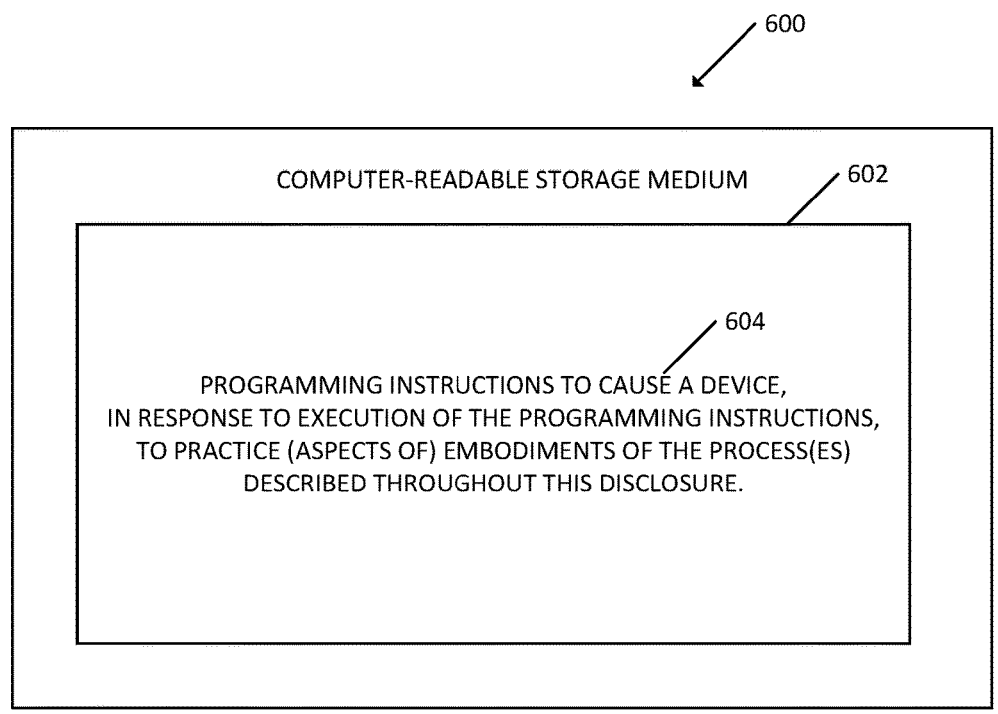
FIG. 6 illustrates an exemplary computer-accessible storage medium 600.

FIG. 6 illustrates an exemplary computer-accessible storage medium 600. The phrase "storage medium" is used herein to generally refer to any type of computer-accessible, computer-usable or computer-readable storage medium or combination of media. It will be appreciated a storage medium may be transitory, non-transitory or some combination of transitory and non-transitory media, and the storage medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, computer-accessible storage medium 600 may include a number of programming instructions 602. Programming instructions may be configured to enable a device, e.g., FIG. 5 computer device 500, in response to execution of the programming instructions, to implement (aspects of) a node executing internal software to manage monitoring sensors, recording events and if needed, updating an output such as a display to alter an initial plan for the node. The programming instructions may be used to operate other devices disclosed herein such as the FIG. 1 devices. In alternate embodiments, programming instructions may be disposed on multiple computer-readable transitory and/or non-transitory storage media. In other embodiments, programming instructions may be disposed on computer-readable storage media and/or computer-accessible media, such as, signals.

Any combination of one or more storage medium may be utilized. The storage medium may be, for example but not limited to, an electronic, magnetic, optical, electromagnetic, infrared, or semiconductor system, apparatus, device, or propagation medium. More specific examples (a non-exhaustive list) of the storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a storage medium may be any medium that can contain, store, communicate, propagate, or transport the program for use by or in connection with the instruction execution system, apparatus, or device. The computer-accessible storage medium may include a propagated data signal with the computer-usable program code embodied therewith, either in baseband or as part of a carrier wave. The program code may be transmitted using any appropriate medium, including but not limited to wireless, wireline, optical fiber cable, RF, etc.

Computer-usable program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. It will be appreciated program code may operate as a distributed task operating on multiple machines cooperatively working to perform program code. In various embodiments, a remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

These computer program instructions may be stored in a storage medium that can direct a computer or other programmable data processing apparatus to function in a particular manner, such that the instructions stored in the storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 7:
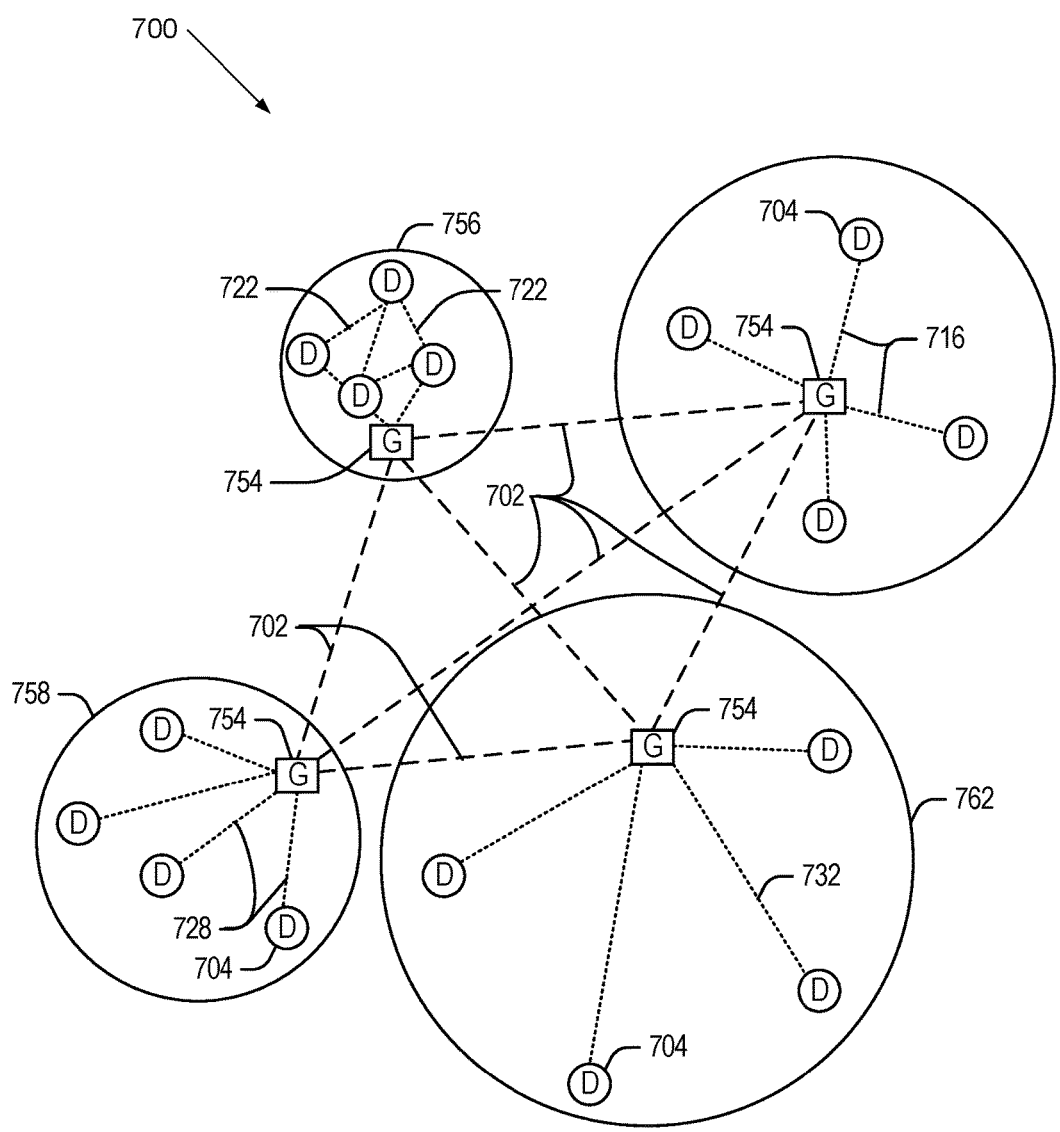
FIG. 7 illustrates a block diagram of a network illustrating communications among a number of IoT devices, according to an example.

FIG. 7 illustrates an example domain topology 700 for respective internet-of-things (IoT) networks coupled through links to respective gateways. The Internet of Things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
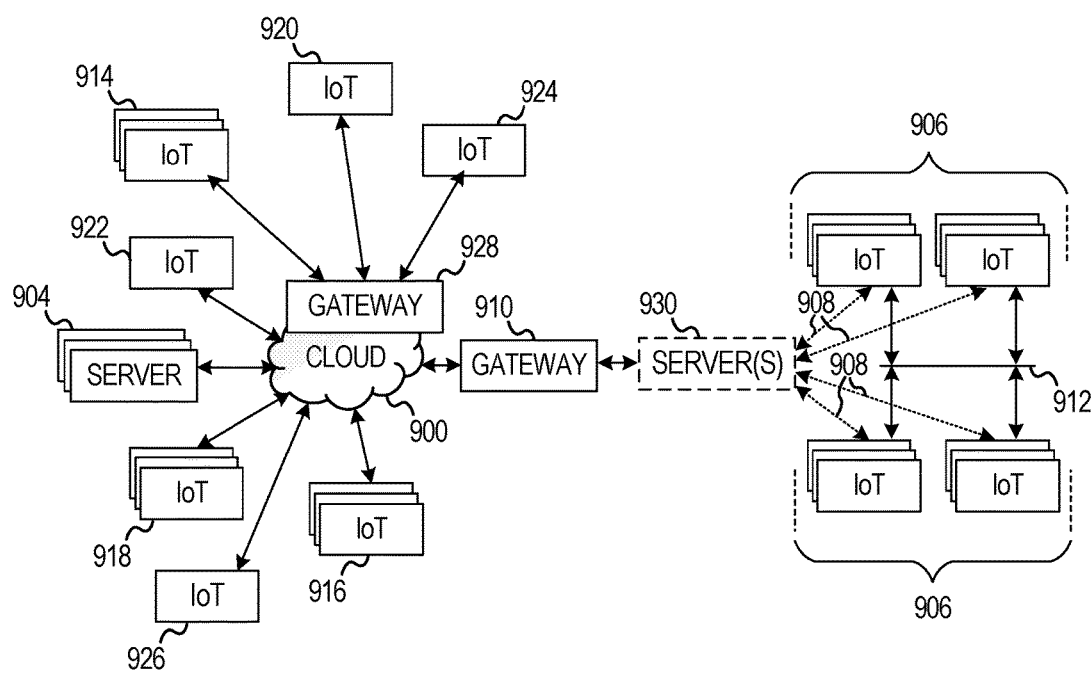
FIG. 9 illustrates a block diagram of a network illustrating communications among a number of IoT devices, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7 and 9, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.8 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies. This is discussed further with respect to the communication environment and hardware of an IoT processing device depicted in other illustrated embodiments.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

Figure 8:
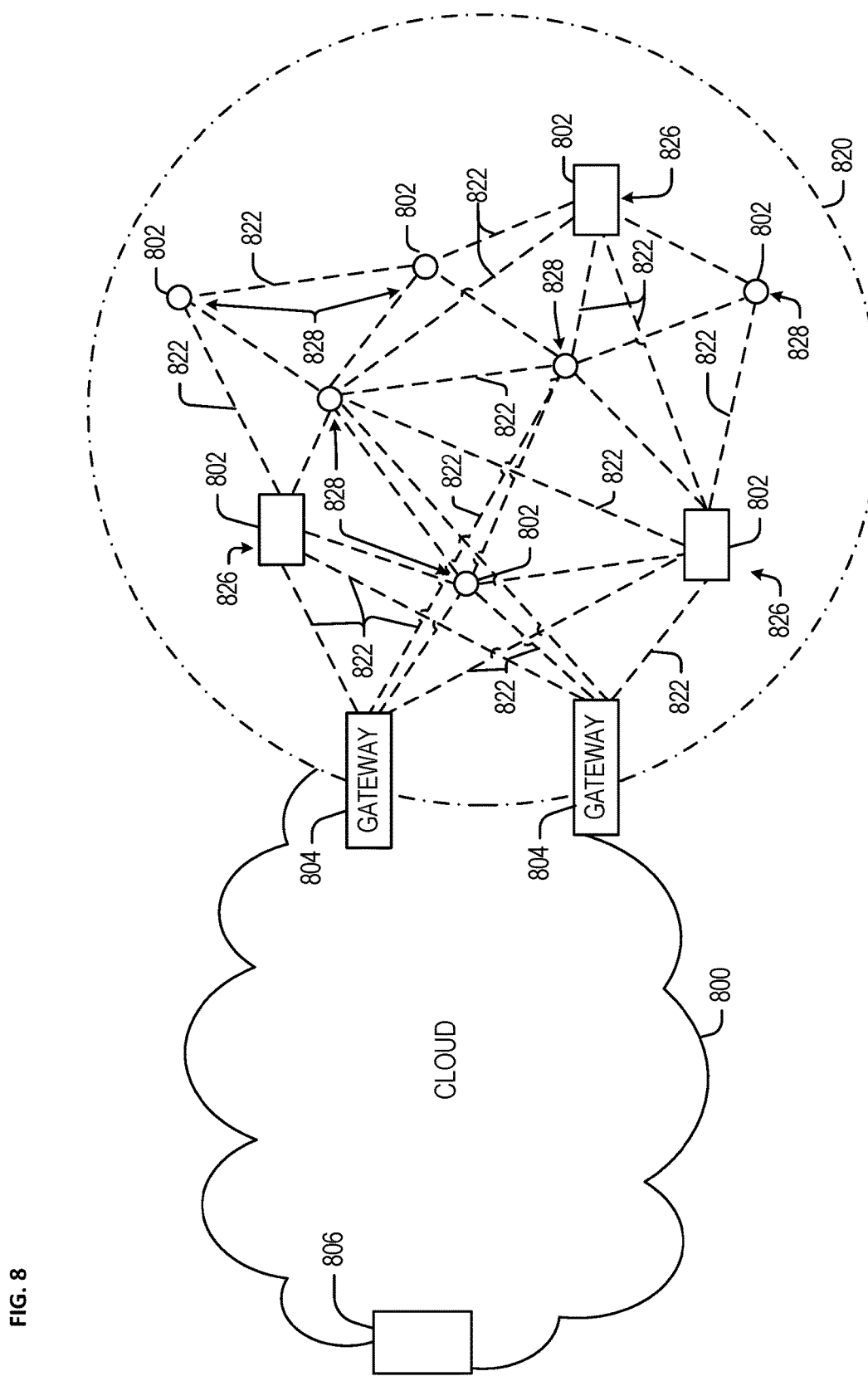
FIG. 8 illustrates a block diagram for an example IoT processing system architecture 900 upon which any one or more of the techniques (e.g., operations, processes, methods, and methodologies) discussed herein may be performed, according to an example.

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800, e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 10:
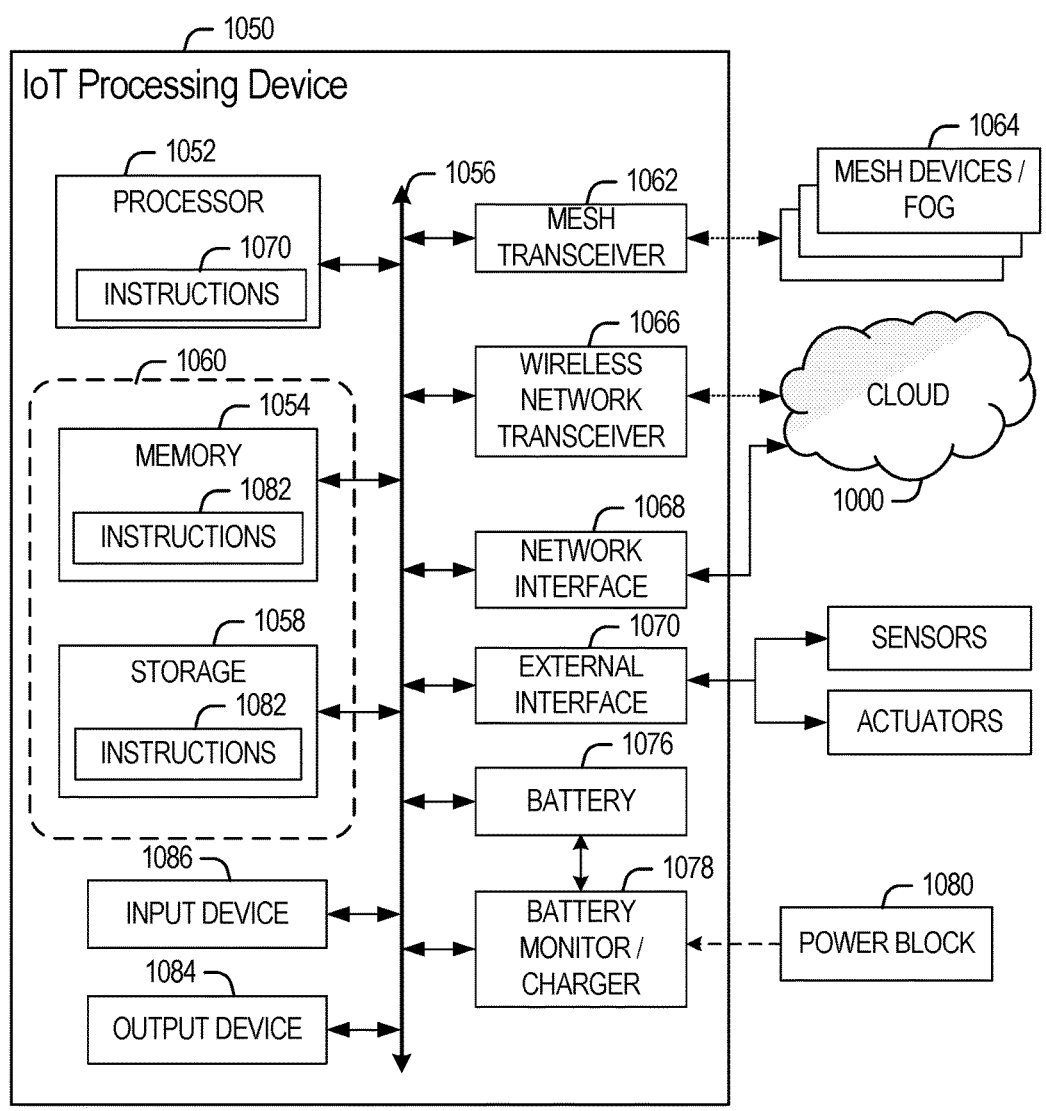
FIG. 10 illustrates a block diagram for an example IoT processing system architecture upon which any one or more of the techniques (e.g., operations, processes, methods, and methodologies) discussed herein may be performed, according to an example.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to monitor directly the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions. Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 may be a node which when caused to move in an environment including one or more machines capable of moving the node based at least in part on a persistent output of the node, comprising: a manifest indicating at least sensor constraints associated with the node; at least one sensor to periodically determine sensor readings associated with the node; a node status having a value set based at least in part on a comparison of selected sensor readings with at least the manifest; the persistent output providing at least a first destination indicator for the node determined based at least in part on the node status, and providing at least a second destination indicator for the node based at least in part on a change in the node status; a persistent memory; and a power source for intermittently powering selected portions of the node.

Example 2 may be example 1, in which the environment includes a wireless power emitter, wherein: the power source has an associated a wireless power receiver; and portions of the node may be intermittently powered while the wireless power receiver receives power from the wireless power emitter.

Example 3 may be example 2 or 1, in which the power source includes a power store for storing at least a portion of power received from the wireless power emitter, wherein portions of the node may be powered with a selected one or more of the wireless power receiver or the power store.

Example 4 may be example 1 or any of examples 2-4, further comprising: a first circuit operating when the node is in a low-power state, the first circuit to monitor the value of the node status for indication of an exception to the manifest, and responsive to the exception, to transition the node from a low-power state to a higher-power state; and a second circuit operating when the node is in a higher-power state, the second circuit to at least record in the persistent memory data corresponding to changes to the value of the node status.

Example 5 may be example 1 or any of examples 2-4, wherein the node is disposed in a selected one of: a near field communication device (NFC), a smart tag, or a smart node.

Example 6 may be example 1 or any of examples 2-5, wherein the persistent memory stores data corresponding to changes to the value of the node, and the data is based at least in part on selected ones of: the sensor readings associated with the node; the node status; or the change in the node status.

Example 7 may be example 1 or any of examples 2-6, wherein the at least one sensor automatically transitions the node between: a low-power state in which access to portions of the node are limited; and a higher-power state in which values from the at least one sensor may be determined, chronologically recorded in the persistent memory, and the persistent output updated based at least in part on the values from the at least one sensor.

Example 8 may be example 1 or any of examples 2-7, further comprising providing a first machine in the environment operable to scan the persistent output of the node and, based at least in part on the scan, redirect a delivery associated with the node.

Example 9 may be example 1 or any of examples 2-8, wherein the node comprises one or more of the following: a humidity sensor, a temperature sensor, an accelerometer, a light sensor, a pressure sensor, a shock sensor, a wireless power receiver, a proximity I/O interface, a positioning system, and a memory including the persistent memory.

Example 10 may be the example of example 1 or any of examples 2-9, further comprising a memory system including a selected one or more of a volatile memory and the persistent memory, wherein the memory system is structured to include: a first section for storing at least results from a self-check of the node; a second section for storing at least the manifest; and a third section for storing at least data corresponding to an exception to the manifest.

Example 11 may be a method for a node to automatically record selected events happening to the node, the node having a memory, an output, multiple sensors, and a manifest identifying a threshold limit for a first sensor of the multiple sensors, and the node being in an environment having machines responsive to the output of the node, the method comprising: indicating a final destination for the node on the output; setting the node to a first power mode in which the first sensor may operate but a second sensor is unable to operate; performing an essential sensor test with the first sensor to obtain a result; determining if an exception occurred based at least in part on comparing the result to the threshold limit; dynamically first updating the output based at least in part on the first result.

Example 12 may be example 11, wherein the node is a tag associated with an asset being moved from a current location and the final destination.

Example 13 may be example 11 or example 12, further comprising: setting the node to a second power mode in which the second sensor may operate; performing a second test with the second sensor to obtain a second result; and dynamically second updating the output based at least in part on the second result.

Example 14 may be example 13 or any of examples 11-12, wherein a continued handling of the node by the machines in the environment is based at least in part on the assigning the second destination content provided on the output.

Example 15 may be example 13 or any of examples 11-12 or 14, further comprising storing selected data from the first and second sensors in the memory.

Example 16 may be example 15 or any of examples 11-14, in which the node includes a communication link, the method further comprising: providing selected data from the memory to a machine in the environment communicatively coupled with the communication link; wherein the communication link is either a communication channel, or a proximity I/O.

Example 17 may be example 11 or any of examples 12-16, wherein the first updating the output comprises a selected one of: replacing the final destination with a new destination, replacing the route with the new destination, or inserting a detour destination within a route determined for the node between a current location and the final destination.

Example 18 may be one or more non-transitory computer-readable media having instructions for a node to automatically record selected events happening to the node, the node having a memory, an output, multiple sensors, and a manifest identifying a threshold limit for a first sensor of the multiple sensors, and the node being in an environment having machines responsive to the output of the node, the instructions, which when executed by one or more devices including the node, provide for: indicating a final destination for the node on the output; setting the node to a first power mode in which the first sensor may operate but a second sensor is unable to operate; performing an essential sensor test with the first sensor to obtain a result; determining if an exception occurred based at least in part on comparing the result to the threshold limit; dynamically first updating the output based at least in part on the first result.

Example 19 may be the one or more non-transitory computer-readable media of example 18, further having instructions to provide for: setting the node to a second power mode in which the second sensor may operate; performing a second test with the second sensor to obtain a second result; and dynamically second updating the output based at least in part on the second result.

Example 20 may be the one or more non-transitory computer-readable media of example 19 or example 18, further having instructions to provide for: storing selected data from the first and second sensors in the memory.

Example 21 may be the one or more non-transitory computer-readable media of example 19 or any of examples 18 or 20, in which the node includes a communication link, the media further having instructions to provide for: transmitting selected data from the memory to a machine in the environment communicatively coupled with the communication link.

Example 22 may be the one or more non-transitory computer-readable media of example 18 or any of examples 19-21, further having instructions to provide for: replacing the final destination with a new destination, replacing the route with the new destination, or inserting a detour destination within a route determined for the node between a current location and the final destination.

Example 23 may be a node means moving in an environment including one or more machines able to move the node based at least in part on a means for persistent output of the node means, comprising: a manifest indicating at least sensor constraints associated with the node; means for at least one sensor to periodically determine sensor readings associated with the node; means for a node status having a value set based at least in part on a comparison of selected sensor readings with at least the manifest; means for the persistent output providing at least a first destination indicator for the node determined based at least in part on the node status, and providing at least a second destination indicator for the node based at least in part on a change in the node status; means for a persistent memory; and means for a power source for intermittently powering selected portions of the node.

Example 24 may be the node means of example 23, further comprising: means for a first circuit operating when the node is in a low-power state, the first circuit to monitor the value of the node status for indication of an exception to the manifest, and responsive to the exception, to transition the node from a low-power state to a higher-power state; and means for a second circuit operating when the node is in a higher-power state, the second circuit to at least record in the persistent memory data corresponding to changes to the value of the node status.

Example 25 may be the node means of example 23 or example 24, wherein the means for at least one sensor automatically transitions the node between: a low-power state in which access to portions of the node are limited; and a higher-power state in which values from the means for at least one sensor may be determined, chronologically recorded in the means for persistent memory, and the means for persistent output updated based at least in part on the values from the means for at least one sensor.

Example 26 may be the node means of example 23 or any of examples 24-25, wherein the node means comprises one or more of: a humidity sensor means, a temperature sensor means, an accelerometer means, a light sensor means, a pressure sensor means, a shock sensor means, a wireless power receiver means, a proximity I/O interface means, a positioning system means, and a memory means including the means for persistent memory.

Example 27 may be the node means of example 23 or any of examples 24-26, further comprising means for a memory system including a selected one or more of means for a volatile memory and the means for persistent memory, wherein the means for memory system is structured to include: means for a first section for storing at least results from a self-check of the node; means for a second section for storing at least the manifest; and means for a third section for storing at least data corresponding to an exception to the manifest.

Example 28 may be a method means for a node to automatically record selected events happening to the node, the node having a memory means, an output means, means for multiple sensors, and a manifest identifying a threshold limit for a first sensor of the means for multiple sensors, and the node being in an environment having machines responsive to the output means of the node, the method comprising: means for indicating a final destination for the node on the output means; means for setting the node to a first power mode in which the first sensor may operate but a second sensor of the means for multiple sensors is unable to operate; means for performing an essential sensor test with the first sensor to obtain a result; means for determining if an exception occurred based at least in part on comparing the result to the threshold limit; means for dynamically first updating the output means based at least in part on the first result.

Example 29 may be the method means of claim 28, further comprising: means for setting the node to a second power mode in which the second sensor may operate; means for performing a second test with the second sensor to obtain a second result; and means for dynamically second updating the output means based at least in part on the second result.

Example 30 may be the method means of example 29 or example 28, in which the node includes a communication link means, the method further comprising: means for providing selected data from the memory to a machine in the environment communicatively coupled with the communication link; wherein the communication link means is means for either a communication channel, or a proximity I/O.

Example 31 may be the method means of example 28 or examples 29-30, wherein the first updating the output means comprises a selected one of: means for replacing the final destination with a new destination, means for replacing the route with the new destination, or means for inserting a detour destination within a route determined for the node between a current location and the final destination. between a current location and the final destination.

It will be apparent to one skilled in the art various modifications and variations can be made in the disclosed embodiments of the disclosed device and associated methods without departing from the spirit or scope of the disclosure. Thus, it is intended the present disclosure covers the modifications and variations of the embodiments disclosed above provided the modifications and variations come within the scope of any claims and their equivalents.

What is claimed is:

1. A node which when caused to move in an environment including one or more machines capable of moving the node based at least in part on a persistent output of the node, comprising:
    a manifest indicating at least sensor constraints associated with the node; at least one sensor to periodically determine sensor readings associated with the node; a node status having a value set based at least in part on a comparison of selected sensor readings with at least the manifest; the persistent output providing at least a first destination indicator for the node determined based at least in part on the node status, and providing at least a second destination indicator for the node based at least in part on a change in the node status; a persistent memory; and
    a power source for intermittently powering selected portions of the node.

2. The node of claim 1, in which the environment includes a wireless power emitter, wherein:
    the power source has an associated wireless power receiver; and
    portions of the node may be intermittently powered while the wireless power receiver receives power from the wireless power emitter.

3. The node of claim 2, in which the power source includes a power store for storing at least a portion of power received from the wireless power emitter,
    wherein portions of the node may be powered with a selected one or more of the wireless power receiver or the power store.

4. The node of claim 1, further comprising:
    a first circuit operating when the node is in a low-power state, the first circuit to monitor the value of the node status for indication of an exception to the manifest, and responsive to the exception, to transition the node from a low-power state to a higher-power state; and
    a second circuit operating when the node is in a higher-power state, the second circuit to at least record in the persistent memory data corresponding to changes to the value of the node status.

5. The node of claim 1, wherein the node is disposed in a selected one of: a near field communication device (NFC), a smart tag, or a smart node.

6. The node of claim 1, wherein the persistent memory stores data corresponding to changes to the value of the node, and the data is based at least in part on selected ones of:
    the sensor readings associated with the node; the node status; or
    the change in the node status.

7. The node of claim 1, wherein the at least one sensor automatically transitions the node between:
    a low-power state in which access to portions of the node are limited; and
    a higher-power state in which values from the at least one sensor may be determined, chronologically recorded in the persistent memory, and the persistent output updated based at least in part on the values from the at least one sensor.

8. The node of claim 1, further comprising providing a first machine in the environment operable to scan the persistent output of the node and, based at least in part on the scan, redirect a delivery associated with the node.

9. The node of claim 1, wherein the node comprises one or more of the following: a humidity sensor, a temperature sensor, an accelerometer, a light sensor, a pressure sensor, a shock sensor, a wireless power receiver, a proximity I/O interface, a positioning system, and a memory including the persistent memory.

10. The node of claim 1, further comprising a memory system including a selected one or more of a volatile memory and the persistent memory, wherein the memory system is structured to include:

a first section for storing at least results from a self-check of the node; a second section for storing at least the manifest; and a third section for storing at least data corresponding to an exception to the manifest.

11. A method for a node to automatically record selected events happening to the node, the node having a memory, an output, multiple sensors, and a manifest identifying a threshold limit for a first sensor of the multiple sensors, and the node being in an environment having machines responsive to the output of the node, the method comprising:

indicating a final destination for the node on the output; setting the node to a first power mode in which the first sensor may operate but a second sensor is unable to operate; performing an essential sensor test with the first sensor to obtain a result; determining if an exception occurred based at least in part on comparing the result to the threshold limit; dynamically first updating the output based at least in part on the result.

12. The method of claim 11, wherein the node is a tag associated with an asset being moved from a current location and the final destination.

13. The method of claim 11, further comprising:

setting the node to a second power mode in which the second sensor may operate; performing a second test with the second sensor to obtain a second result; and dynamically second updating the output based at least in part on the second result.

14. The method of claim 13, wherein a continued handling of the node by the machines in the environment is based at least in part on the assigning second destination content provided on the output.

15. The method of claim 13, further comprising storing selected data from the first and second sensors in the memory.

16. The method of claim 15, in which the node includes a communication link, the method further comprising:

providing selected data from the memory to a machine in the environment communicatively coupled with the communication link; wherein the communication link is either a communication channel or a proximity I/O.

17. The method of claim 11, wherein the first updating the output comprises a selected one of:

replacing the final destination with a new destination, replacing a route with the new destination, or inserting a detour destination within a route determined for the node between a current location and the final destination.

18. One or more non-transitory computer-readable media having instructions for a node to automatically record selected events happening to the node, the node having a memory, an output, multiple sensors, and a manifest identifying a threshold limit for a first sensor of the multiple sensors, and the node being in an environment having machines responsive to the output of the node, the instructions, which when executed by one or more devices including the node, provide for:

indicating a final destination for the node on the output; setting the node to a first power mode in which the first sensor may operate but a second sensor is unable to operate; performing an essential sensor test with the first sensor to obtain a result; determining if an exception occurred based at least in part on comparing the result to the threshold limit; dynamically first updating the output based at least in part on the result.

19. The one or more non-transitory computer-readable media of claim 18, further having instructions to provide for:

setting the node to a second power mode in which the second sensor may operate; performing a second test with the second sensor to obtain a second result; and dynamically second updating the output based at least in part on the second result.

20. The one or more non-transitory computer-readable media of claim 19, further having instructions to provide for:

storing selected data from the first and second sensors in the memory.

21. The one or more non-transitory computer-readable media of claim 19, in which the node includes a communication link, the media further having instructions to provide for:

transmitting selected data from the memory to a machine in the environment communicatively coupled with the communication link.

22. One or more non-transitory computer-readable media of claim 18, further having instructions to provide for:

replacing the final destination with a new destination, replacing a route with the new destination, or inserting a detour destination within a route determined for the node between a current location and the final destination.

* * * * *